US007738009B2

(12) United States Patent
Rottmann

(10) Patent No.: US 7,738,009 B2
(45) Date of Patent: Jun. 15, 2010

(54) METHOD FOR FOLLOWING AT LEAST ONE OBJECT IN A SCENE

(75) Inventor: Frank Rottmann, München (DE)

(73) Assignee: Robert Bosch GmbH, Stuttgart (DE)

( * ) Notice: Subject to any disclaimer, the term of this patent is extended or adjusted under 35 U.S.C. 154(b) by 1120 days.

(21) Appl. No.: 10/507,040

(22) PCT Filed: Mar. 6, 2003

(86) PCT No.: PCT/DE03/00700

§ 371 (c)(1),
(2), (4) Date: Feb. 16, 2005

(87) PCT Pub. No.: WO03/079306

PCT Pub. Date: Sep. 25, 2003

(65) Prior Publication Data

US 2005/0128298 A1 Jun. 16, 2005

(30) Foreign Application Priority Data

Mar. 13, 2002 (DE) ................................ 102 10 926

(51) Int. Cl.
*H04N 5/225* (2006.01)

(52) U.S. Cl. ...................................................... 348/169

(58) Field of Classification Search ....................... None
See application file for complete search history.

(56) References Cited

U.S. PATENT DOCUMENTS

| | | | | |
|---|---|---|---|---|
| 5,554,983 | A * | 9/1996 | Kitamura et al. | 340/937 |
| 5,966,074 | A * | 10/1999 | Baxter | 340/565 |
| 6,570,608 | B1 * | 5/2003 | Tserng | 348/143 |
| 7,436,887 | B2 * | 10/2008 | Yeredor et al. | 375/240.01 |

FOREIGN PATENT DOCUMENTS

| | | |
|---|---|---|
| EP | 0 525 318 | 2/1993 |
| EP | 0 967 584 | 12/1999 |

* cited by examiner

*Primary Examiner*—Nhon T Diep
(74) *Attorney, Agent, or Firm*—Kenyon & Kenyon LLP

(57) ABSTRACT

A method is provided for monitoring at least one object in a scene, which method provides that, once a moving object stops and comes to a standstill, the dwell time at standstill is counted so as to generate a signaling as a function of the dwell time. The object is described by a list or a matrix characterizing the direction of movement and the time.

16 Claims, 2 Drawing Sheets

METHOD FOR FOLLOWING AT LEAST ONE OBJECT IN A SCENE

FIELD OF THE INVENTION

The present invention relates to a method for tracking at least one object in a scene.

BACKGROUND INFORMATION

Video sensors based on modern computer architectures are able to detect objects moving in a directional manner in image sequences of stationary cameras. The monitoring normally tracks the beginning point at which predefined threshold values with respect to segment distance or size are exceeded. Such condition is detected by changes in the image signal caused by the movement of objects such as persons, for example, whereupon a corresponding signaling or image recording takes place. In this manner, the objective of raising an alarm concerning an unauthorized entry may be realized.

SUMMARY

The method according to the present invention for tracking at least one object in a scene has the advantage that it generates a signaling as a function of the dwell time of an object at a particular location. In this way, an atypical behavior pattern in a monitored scene in which moving objects are usually present is detected immediately. This may result in a more rapid alarm triggering, and in better monitoring. In the process, objects that have made the transition from movement to standstill are able to be detected and result in a signal.

It is advantageous that in accordance with the present invention, the signaling, which is generated as a function of a counter reading, results in an alarm. This means that an alarm is generated when an object remains stationary for a predefined period of time, the predefined time constituting a threshold value for the counter reading.

The movement of a particular object is described by a list or a matrix: in one line, the image coordinates of the object in the x-direction are stored at different instants for the individual images of an image sequence and, in a second line, the corresponding y-values are stored, that is, the vertical values of the object at these corresponding instants. The x-value and the y-value at a predefined time instant represent a motion vector, i.e., in the movement direction of an object. If this motion vector is zero, a standstill is detected and the counter incremented. The list may be dynamically managed or, if a predefined number of list locations has been processed, it is possible that cumulative values are carried over into a new list for this object. This list representation makes it possible to monitor, and thereby track, several objects simultaneously. This is then managed with the aid of a processor of the video monitoring system and administered in the associated memory. A camera, which generates the image sequence, acts as imaging element. The images may be produced at relatively long intervals of half a second, for instance, so as to be able to detect the corresponding motions in a meaningful manner. Such motion vectors in a list may also be generated between images that do not follow each other immediately, for instance when the movements are very slow, which allows high resolution of the motion. This may be done dynamically, i.e., if no movement is detected, a counter may simultaneously be started while the comparison continues up to a certain number of image sequences, above which a standstill is then conclusively detected, and the counter reading ultimately becomes relevant.

The list may then be newly initialized as soon as movement begins anew. If values for the object able to be detected by an object-detection method are already available from a previous list, these may be carried over into the new list. This also makes it possible to analyze an entire movement sequence, which method is very efficient with respect to the memory resources.

Furthermore, it is advantageous that a reference image is generated so as to recognize an object in a simple manner. To generate a time and object template, a so-called reference image must be obtained that, if possible, contains only the background of the scene, without tracked objects. This reference image is generally obtained when no object is present, for example, from the next-to-last image. This image may then be adopted as reference. This method is useful, in particular, for a small number of objects which make only a brief appearance in the scene. However, if many objects are tracked over longer periods of time, a reference image is generated in such a way that, after having determined the object positions in the instantaneous image, the reference image is carried over into the remaining area from the next-to-last image. This is referred to as local adaptation of the reference image.

The method according to the present invention may be used in video monitoring, in particular, where at least one image generator, a processor, a memory and also output means, by which a signaling, such as an alarm, may then be implemented, are provided. However, the signaling may also be utilized as a signal for other systems. This video monitoring may be used to monitor a parking facility, for example.

DETAILED DESCRIPTION

Figure 3:
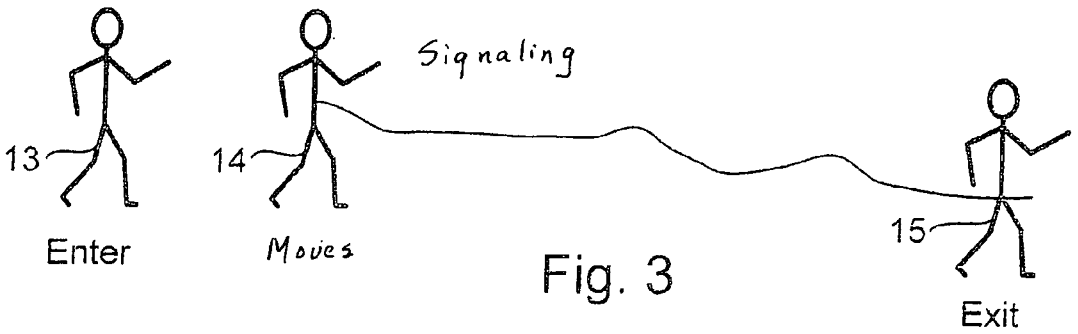
FIG. 3 is a first example of video monitoring according to the present invention.

According to the present invention, it is possible to fully track objects across a scene, i.e., a monitored area. An object entering the scene is detected very quickly as a directionally moving object and monitored in the scene until the object leaves the scene again, such monitoring also being known as tracking. This is shown in FIG. 3. At location 13, a person enters the scene monitored by an image detector, that is, a video sensor, for example, or some other camera, such as a heat image camera. Since the evaluation of the video monitoring detects movement only, the object is not yet detected in the first image sequence. Only at instant 14, after a movement has been detected, is this object identified. At instant 15, the moving object has left the monitored scene.

Figure 4:
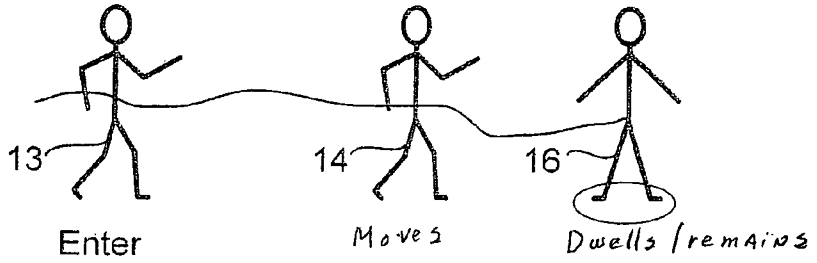
FIG. 4 is a second example of video monitoring according to the present invention.

FIG. 4 shows a second scenario. Here, too, a person enters the scene at instant 14 and is detected as a moving object at instant 14. However, the person stops moving at instant 16 and comes to a standstill, whereupon the method according to the present invention starts a counter in order to monitor the dwell time. A signal may then be generated as a function of the dwell time. This signaling may be an alarm, for instance.

Figure 5:
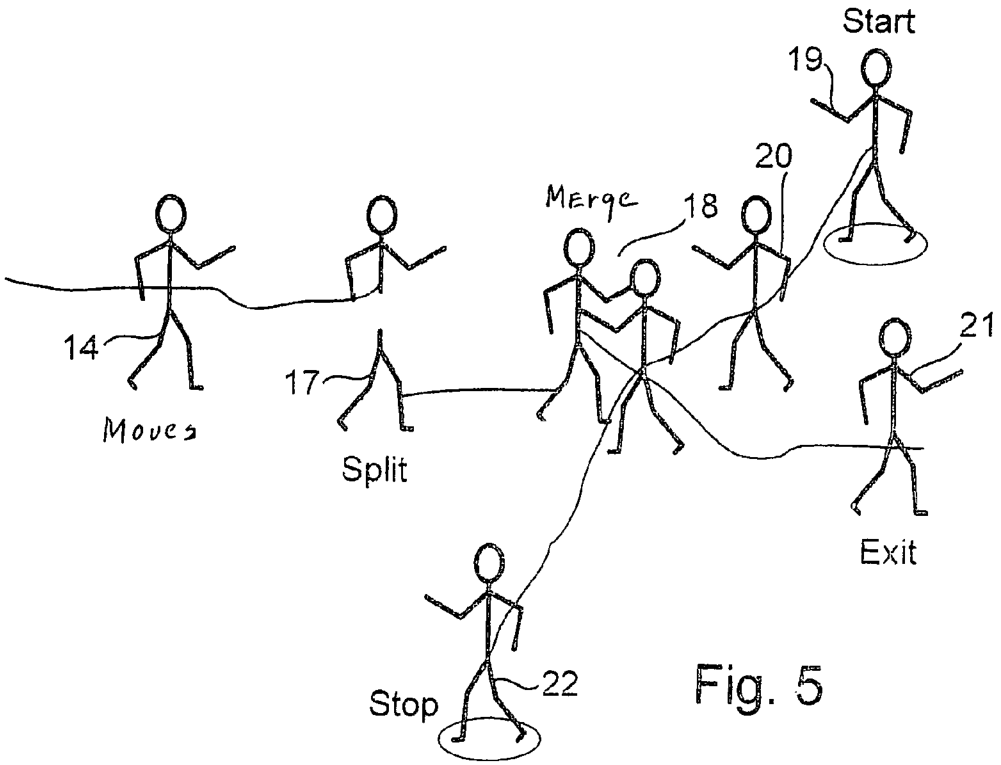
FIG. 5 is a third example of video monitoring according to the present invention.

FIG. 5, in a third scenario, shows additional possibilities for a plurality of objects. An object 14 is detected as moving.

At instant 17, a split is implemented here, that is, the object is split into two objects. This is detected by different motion vectors originating from the same object. Instant 18 shows a so-called merge, i.e., a merging of two objects, which may then lead to another split. This merge is caused by an additional object 19, which was detected as moving object 20. The first object leaves the scene at instant 21, while the second object makes the transition from movement to standstill at instant 22.

Figure 1:
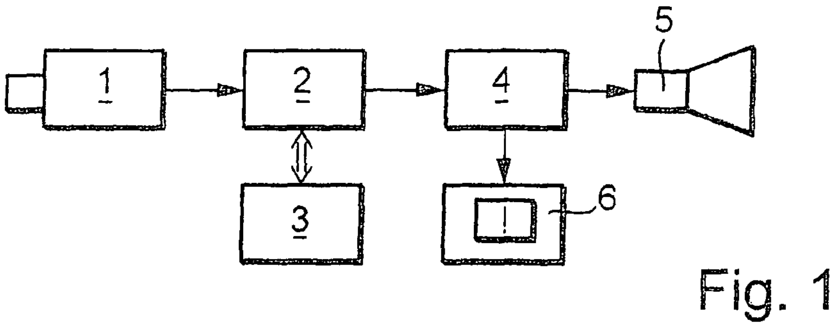
FIG. 1 is a block diagram of the video monitoring system according to the present invention.

FIG. 1 shows a block diagram of a video monitoring system according to the present invention. An image detector, a monitoring camera 1 in this case, is connected to a processor 2. A memory 3 is connected to processor 2 via a data input/output. By means of a data line, processor 2 is connected to a control 4, which is connected to a loudspeaker 5 on one side and to a display 6 on the other side.

Figure 2:
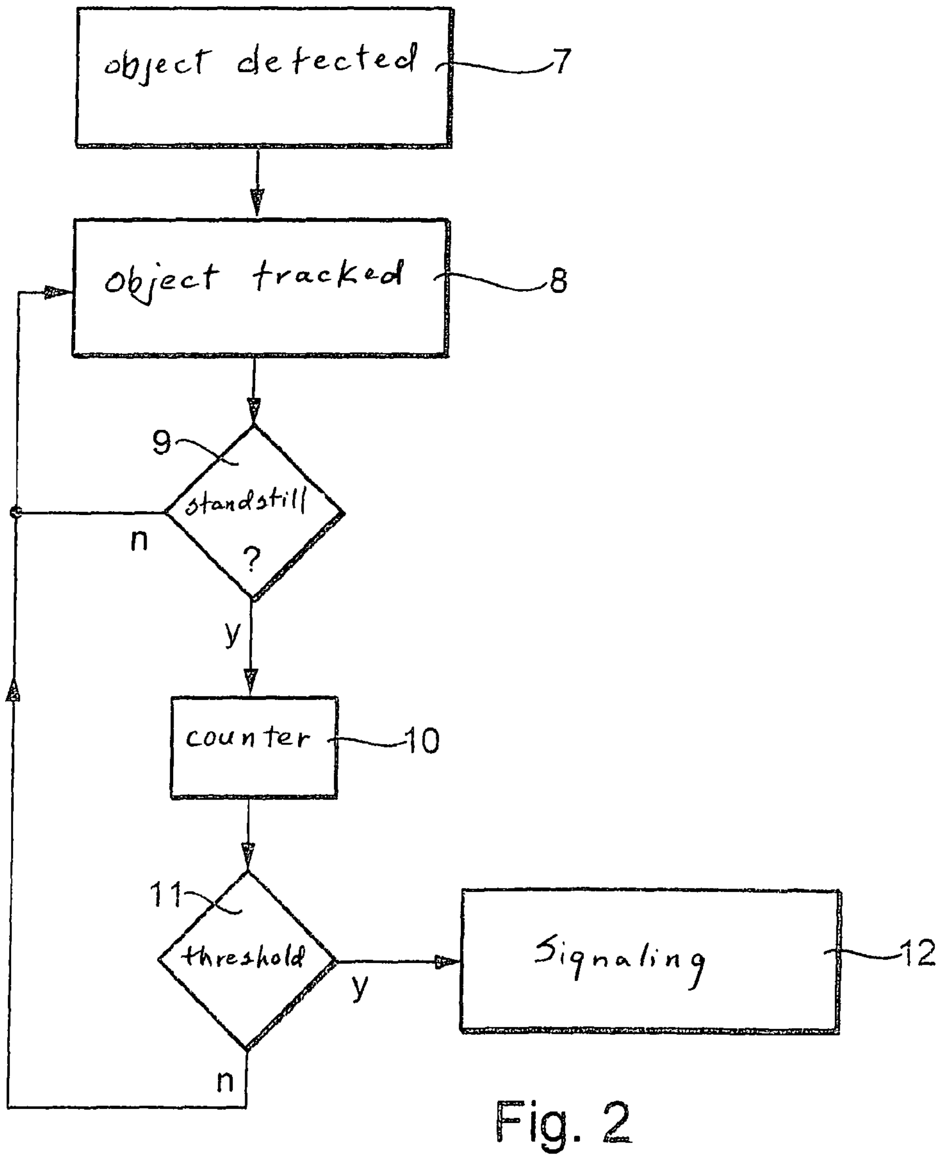
FIG. 2 is a flow chart of the method according to the present invention.

Only one camera 1 is indicated here by way of example. However, a plurality of cameras may be provided so as to monitor several scenes simultaneously and have these cameras operated by a processor 2. Furthermore, only one loudspeaker 5 and one display 6, which are used to output an alarm, are illustrated here by way of example. However, the signaling transmitted from processor 2 to control 4 may be used as well. The method according to the present invention, which will now be elucidated on the basis of the flow chart shown in FIG. 2, may be executed on processor 2. In method step 7, on the basis of the motion vector and with the aid of camera 1 and processor 2, a moving object is detected, as shown in FIG. 3. A list or matrix is prepared for this purpose, in which each column, for instance, denotes a specific image in an image sequence, with the image sequences being separated by time intervals, such as one second, for example. Furthermore, the list has two lines defining the motion vector in a plane. This is normally defined by the coordinates x and y, for instance. Two lists illustrating this are shown below. In list 1, a motion vector having x-value 123 and y-value 12 is detected at instant 0. At instant 99, which corresponds to 50 seconds in this case, a standstill is counted that has already begun at instant 1, which corresponds to one second. This is a predefined list, that is, it allows only 100 new entries.

For this reason, the list is newly initialized once instant 99 is reached, and it is continued with the second list, which adopts the value. As shown, values 123 and 12 are reentered at instant 0 and standstill 0/0 at instant 1. However, the 50 seconds are then added at instant 2, and counting resumes anew.

List 1:

| | | | | | | |
|---|---|---|---|---|---|---|
| Instant | 0 | 1 | 2 | 3 | . . . | 99 |
| X | 123 | 1 | 2 | 0 | . . . | 0 |
| Y | 12 | 0 | 3 | 0 | . . . | 0 |
| | 0:00 | 0:01 | 0:02 | 0:03 | | 0:50 |

List 1, newly initialized:

| | | | | |
|---|---|---|---|---|
| Instant | 0 | 1 | 2 | 3 |
| X | 123 | 0 | 0 | 0 |
| Y | 12 | 0 | 0 | 0 |
| | 0:00 | 0:03 | 0:51 | 0:52 |

Using this list, the object is tracked in method step 8. If a standstill is detected in method step 9, namely by entries 0/0 in the list, the counter is started in method step 10. If this is not the case, the object continues to be tracked by the list. However, if the counter was started in method step 10, it is ascertained in method step 11 whether a predefined threshold is reached. Reaching this threshold causes a signaling in method step 12. In this case, the signaling may be implemented by means of loudspeaker 5 or display 6, that is, by outputting an alarm, for instance. However, if this threshold is not reached and the object moves again, it is returned to method step 8 and the tracking of the object resumes.

What is claimed is:

1. A method for tracking at least one object in a scene, comprising:

detecting, by means of an image detector, a sequence of images of the scene;

determining a movement of at least one object in the scene based on the sequence of images;

starting a counter when the movement of the at least one object comes to a standstill;

enabling counting of the counter only if the at least one object continues to be in the standstill;

generating a signal when a counter value of the counter reaches a predetermined threshold value;

recording the movement of the at least one object as entries in a list, and when the list is full, re-initializing the list while carrying over at least one entry from the list; and when a most recent entry of the list corresponds to the standstill and the list is full, re-initializing the list while carrying over a most recent entry that corresponds to the movement of the at least one object in addition to carrying over the most recent entry corresponding to the standstill.

2. The method as recited in claim 1, wherein the signal triggers at least one of an audio alarm and visual alarm.

3. The method as recited in claim 1, further comprising:

generating the list to describe the movement of the at least one object with respect to the direction of movement and the time.

4. The method as recited in claim 3, further comprising:

detecting a new movement of the at least one object after coming to the standstill; and responsive to the detecting of the new movement, re-initializing the list.

5. The method as recited in claim 3, further comprising:

generating a reference image, wherein the reference image is used to identify the at least one object in the scene.

6. The method as recited in claim 5, wherein, after identifying the position of the at least one object, the reference image is adapted onto remaining areas of the scene from at least one preceding image.

7. The method as recited in claim 5, further comprising:

selecting a length of a time interval between the sequence of images, the length being sufficiently long enough to capture a meaningful amount of object movement between images.

8. The method of claim 1, wherein the most recent entry corresponding to the movement of the at least one object and the most recent entry corresponding to the standstill are carried over as respective first and second consecutive entries of the reinitialized list.

9. The method of claim 8, further comprising:

assigning a time to each of the carried over entries, wherein a difference in time between the carried over entries is the same as a difference in time between the entries prior to being carried over.

10. The method as recited in claim 1, further comprising:

generating the list to describe the movement of the at least one object with respect to the direction of movement and the time;

detecting a new movement of the at least one object after coming to the standstill;

responsive to the detecting of the new movement, re-initializing the list;

generating a reference image, wherein the reference image is used to identify the at least one object in the scene; and selecting a length of a time interval between the sequence of images, the length being sufficiently long enough to capture a meaningful amount of object movement between images, wherein the signal triggers at least one of an audio alarm and visual alarm, and wherein, after identifying the position of the at least one object, the reference image is adapted onto remaining areas of the scene from at least one preceding image.

11. A video monitoring system for tracking at least one object in a scene, comprising:

at least one image detector for detecting a sequence of images of the scene;

a processor connected to the image detector for determining a movement of at least one object in the scene based on the sequence of images, wherein the processor starts a time count when the movement of the at least one object comes to a standstill, the time count continuing only if the object continues to be in the standstill;

a memory to store the determined movement of the at least one object as entries in a list; and an output arrangement connected to the processor for generating a signal when the time count value reaches a predetermined threshold value;

wherein when the list is full, the processor re-initializes the list while carrying over at least one entry from the list, and when a most recent entry of the list corresponds to the standstill and the list is full, the processor re-initializes the list while carrying over a most recent entry that corresponds to the movement of the at least one object in addition to carrying over the most recent entry corresponding to the standstill.

12. The system as recited in claim 11, wherein the processor generates the list to describe the movement of the at least one object with respect to the direction of movement and the time.

13. The system as recited in claim 12, wherein the processor is configured to:

determine a new movement of the at least one object after coming to the standstill; and responsive to the determining of the new movement, re-initialize the list.

14. The system as recited in claim 12, wherein a reference image is generated, the reference image being used to identify the at least one object in the scene.

15. The system as recited in claim 11, wherein the processor is configured to carry over the most recent entry corresponding to the movement of the at least one object and the most recent entry corresponding to the standstill as respective first and second consecutive entries of the reinitialized list.

16. The system as recited in claim 15, wherein a time is assigned to each of the carried over entries, a difference in time between the carried over entries being the same as a difference in time between the entries prior to being carried over.

* * * * *